United States Patent

[11] 3,615,753

| [72] | Inventors | Freddy Jean Heinrichs<br>Embourg;<br>Roland Louis Pattyn, Liege, both of Belgium |
|---|---|---|
| [21] | Appl. No. | 39,144 |
| [22] | Filed | May 20, 1970 |
| [45] | Patented | Oct. 26, 1971 |
| [73] | Assignee | Fonderies Magotteaux, societe anonyme<br>Vaux-sous-Chevremont, Belgium |
| [32] | Priority | May 21, 1969 |
| [33] | | Belgium |
| [31] | | 42,280 |

[54] METHOD FOR MANUFACTURING FOUNDRY MOLDS
6 Claims, No Drawings

[52] U.S. Cl. .................................................. 106/38.3,
106/38.9
[51] Int. Cl. .................................................. B28b 7/34
[50] Field of Search ........................................ 106/38.3–38.9

[56] References Cited
UNITED STATES PATENTS

| 1,657,573 | 1/1928 | Hanley .................... | 106/38.9 |
| 2,256,943 | 9/1941 | Dunbeck .................. | 106/38.9 X |
| 2,586,814 | 2/1952 | Greenewald ............. | 106/38.9 |
| 2,701,207 | 2/1955 | Greenewald ............. | 106/38.9 |
| 2,997,400 | 8/1961 | Greenewald ............. | 106/38.9 |

Primary Examiner—Lorenzo B. Hayes
Attorney—Young & Thompson

ABSTRACT: Foundry sand is produced with a binder of swellable clay and greatly increased cohesion, by mixing the binder with more than twice the desired amount of water and then reducing this amount of water to at least the level at the time of forming the sand mold. The water can also be reduced to substantial dryness. The initial proportion of water should be two to 20 times the working proportion. The clay can for example be bentonite.

METHOD FOR MANUFACTURING FOUNDRY MOLDS

The present invention relates to the production of granular materials with a binder in the form of a swellable clay and water.

Particularly in foundry practice, it is known to make use of molds in which the metal is cast to cool. These molds are usually formed of a refractory granular material such as sand, and a binder constituted by a swellable or colloidal clay and water. The sand and clay and water are mixed together in the same proportions that they will have when the material is shaped to form the mold.

These constituents are introduced g./cm.², mixer whose action is not only to form a homogeneous mixture or distribution of the constituents among each other, but also to coat the grains of sand with the binder provided by the clay and the water. This coating action has a major effect on the cohesion of the resulting product and on the strength of the finished mold.

To obtain a mold having a given strength, it is necessary to use a thus-prepared mixture of sand and binder having a predetermined cohesion. In practice, the cohesion may be varied by varying the percentage of clay in the binder. Also, the duration of mixing and the type of mixture employed may have a relatively minor effect on the cohesion of the sand of a given mold composition.

For a given mixture, there is a period of mixing which gives maximum cohesion and which when exceeded does not augment the cohesion. Thus, mixing for a longer period of time is useless; and so for a given sand prepared in a known manner, there is actually a maximum cohesion which until the advent of the present invention could not be exceeded.

It is therefore an object of the present invention to provide methods for the agglomeration of a granular material, by which relatively high strength of the agglomerated material is achieved.

Another object of the present invention is the provision of a granular material agglomerated with a binder of a swellable clay and having relatively high compressive strength.

A further object of the present invention is the provision of foundry mold sand and methods of producing the same, which will result in molds having high resistance to damage.

Finally, it is an object of the present invention to provide agglomerated granular materials and methods of making the same, which will be relatively simple and inexpensive to produce and easy to use with uniformly desirable results. 9 Other objects and advantages of the present invention will become apparent from a consideration of the following description.

The present invention breaks through this upper limit and permits, for a given binder and quantity of binder, the attainment of a degree of cohesion substantially higher than could be obtained heretofore. According to the present invention, these improved results are obtained by using an initial proportion of water which is substantially higher than the proportion of water which will be present when the sand is formed, that is, when the mold is made, and the excess water is eliminated prior to utilization of the same to form the mold.

This initially higher proportion of water should be at least twice the proportion of water present at the time of forming the sand to the shape of the mold (hereinafter called the working proportion) and may for example have a value which provides maximum swelling of the binder corresponding to the saturation of the binder with water. The initial percentage will usually be between two and 20 times the working percentage.

Although the present invention is useful in the preparation of granular materials with a binder in general, it is of particular utility in connection with the production of foundry mold sands and will be illustrated in that environment in the following example, which is given for the purpose of enabling those skilled in this art to practice the invention:

EXAMPLE

To 20 kgs. of synthetic silica sand of 65 AFA fineness, there are added 1.2 kg. of natural American Western-type soda bentonite in finely divided form and 12 liters of water at room temperature. These constituents are introduced into the chamber of an ordinary paddle-type mixer where they undergo mixing for 32 hours.

During the course of mixing, the bentonite absorbs water and swells to the maximum and constitutes a binder which coats the grains of sand. The long-continued action in the mixer also has the function of reducing the water content by evaporation, until the water content is 3 percent by weight of the whole.

The resulting mixture is tamped to the form of test specimens at this 3 percent working proportion of water, and the cohesion of these specimens is measured with an apparatus of the type SPDR with respect to resistance to compression. A resistance to compression of 1,450 g./cm.² is obtained.

Exactly corresponding test specimens are produced, but with the initial water proportion of 3 percent equal to the working proportion of 3 percent; and a resistance to compression of only 750 g./cm.² is obtained.

A series of additional tests is conducted with the working proportion of the water varying between 1 percent and 8 percent by weight; and these are plotted on a diagram on which the compressive resistance in g./cm.² is plotted on the ordinate and the working proportion of water is plotted on the abscissae.

The same diagram can show the corresponding values which are obtained when the initail and working proportions of water are the same. Comparison of the curves of such a diagram will show the resistance to compression of sands agglomerated by the methods of the present invention are practically double those obtained by known methods.

If a lower compressive strength is acceptable, then the present invention can be utilized so as to reduce the proportion of the relatively expensive binder or swellable clay. Thus, the use of only 3 percent by weight of bentonite in the mixture, but with a procedure according to the present invention, can be shown by a third curve on the said diagram; while the same proportion of bentonite but a procedure according to the prior art, in which the initial and working percentages of water are the same, can be shown by a fourth curve. From a consideration of these curves, it is evident that, for a required compressive resistance of, say, 750 g./cm.², 3 percent bentonite and a working proportion of 2 percent water can be used; while to obtain the same compressive resistance according to the prior art, 6 percent by weight of bentonite and 3 percent of water are required.

The elimination of excess water, according to the present invention, can be effected in any known manner, for example, by evaporation during mixing and accompanied if desired by heating. Of course, the removal of excess water should not be conducted in such a way as to alter the properties of the binder other than by reducing the water content.

It will also be recognized that the present invention is not limited to the reduction of the water content to the working proportion. Instead, liquid reduction can be conducted until the material is virtually dry, whereupon the material can be prepared in the form of pellets for rewetting prior to use. The advantageous results of the present invention, however, are obtained regardless of how low the liquid content is taken prior to reconstitution, given only that the initial water content was in excess within the meaning of the present invention.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described our invention, we claim:

1. In a method of forming a foundry sand mold, comprising admixing silica sand with a small amount of a swellable clay and water in an initial amount at least to saturate said clay and forming the mixture into the mold shape; the improvement comprising, evaporating water from the mixture prior to said forming until a reduced quantity no more than half said initial quantity of water remains.

2. A method as claimed in claim 1, in which said initial quantity of water is 2 to 20 times said reduced quantity.

3. A method as claimed in claim 1, in which said reduced water content is 1 percent to 8 percent by weight of the whole.

4. A method as claimed in claim 1, in which said reduced water content is about 2 percent to 3 percent by weight of the whole.

5. A method as claimed in claim 1, in which said evaporating is continued to dryness and water is added to reconstitute said sand prior to said forming, said reduced water content at forming being more more than half said initial quantity of water.

6. A method as claimed in claim 1, said reduced quantity of water and said reduced water content being substantially the same.